United States Patent [19]

Kim

[11] Patent Number: 5,463,611
[45] Date of Patent: Oct. 31, 1995

[54] LOADING APPARATUS OF A MULTI-DISC PLAYER

[75] Inventor: Jungtae Kim, Seoul, Rep. of Korea

[73] Assignee: Daewoo Electronics Co., Ltd., Seoul, Rep. of Korea

[21] Appl. No.: 159,657

[22] Filed: Nov. 30, 1993

[30] Foreign Application Priority Data

Nov. 30, 1992 [KR] Rep. of Korea ............ 92-22901

[51] Int. Cl.⁶ .................. G11B 17/04; G11B 17/08
[52] U.S. Cl. ............ 369/191; 369/75.2; 369/77.1
[58] Field of Search .................. 369/75.1, 75.2, 369/77.1, 77.2, 191, 34, 36, 178

[56] References Cited

U.S. PATENT DOCUMENTS

| | | |
|---|---|---|
| 3,345,775 | 10/1967 | Crosby . |
| 4,498,162 | 2/1985 | Schatteman ............... 369/77.1 |
| 4,523,306 | 6/1985 | Staar .................... 369/77.1 |
| 4,564,930 | 1/1986 | Funabashi et al. ........ 369/75.2 |
| 4,625,304 | 11/1986 | Kanamaru et al. ........ 369/75.2 |
| 4,715,025 | 12/1987 | Eijsermans ............... 369/75.2 |
| 4,839,880 | 6/1989 | d'Alayer de Costenore d'Arc et al. ............. 369/75.2 |
| 4,949,328 | 8/1990 | Kase et al. .............. 369/75.2 |
| 5,067,121 | 11/1991 | Einhaus .................. 369/75.2 |

FOREIGN PATENT DOCUMENTS

| | | |
|---|---|---|
| 0400949 | 12/1990 | European Pat. Off. . |
| 61-170954 | 8/1986 | Japan ..................... 369/77.1 |

Primary Examiner—Stuart S. Levy
Assistant Examiner—William J. Klimowicz
Attorney, Agent, or Firm—Beveridge, DeGrandi, Weilacher & Young

[57] ABSTRACT

A loading apparatus of a multi-disc player having a simplified structure and a stable loading operation is disclosed. The loading apparatus comprises a tray base combined integrally with a chuck arm. A cam gear which is rotated by a driving motor is located on a stationary chassis. A lift arm is rotatably connected to the cam gear. Each of a couple of sliding plates is movably connected to respective ends of the lift arm. A shifting gear which is rotatably fixed to the tray base is meshed with a shifting rack formed on a disc tray, thereby shifting the disc tray forwards or backwards. A power transmission gear is meshed with the cam gear and the shifting gear.

6 Claims, 9 Drawing Sheets

LOADING APPARATUS OF A MULTI-DISC PLAYER

BACKGROUND OF THE INVENTION

1. Field of the Invention

The present invention relates to a loading apparatus of a multi-disc player, and more particularly to a loading apparatus of a multi-disc player in which a chuck arm and a tray base integrally connected with the chuck arm are movable simultaneously by a lift arm which rotates by a cam gear.

2. Description of the Prior Art

In a conventional loading apparatus of a multi-disc player, an optical disc such as a compact disc (CD) or laser disc (LD) is loaded in a movable disc tray at a disc loading position, and then the optical disc is positioned at a disc reproducing position to reproduce the records stored on the optical disc by an optical pickup.

U.S. Pat. No. 4,839,880 describes a disc player having means for front loading using a movable tray for carrying a disc to a turntable.

Also, EP 0 400 949 A2 discloses a disc loading apparatus comprising a disc tray supported on a stationary chassis, a movable chassis which supports a disc rotating mechanism and which can be moved up and down relative to the stationary chassis, elevating means for moving the movable chassis in the up and down direction, and drive means for moving the disc tray and which operates the elevating means.

Such disc loading apparatus described above, however, is complex in structure and weighs much.

SUMMARY OF THE INVENTION

The main object of the present invention is to overcome these shortcomings and disadvantages by providing a disc loading apparatus wherein the elevation of the combination of a chuck arm and a tray base is simultaneously made and the forward and backward movement of a disc tray can be implemented more stably.

In order to accomplish the aforenoted object, a loading apparatus in accordance with the present invention comprises a tray base which is combined integrally with a chuck arm, the tray base being located above a stationary chassis; a cam gear located on the stationary chassis and rotated by a drive means comprising a motor, pulley and a reduction gear; a lift arm provided with a pivotal pin at the lower center portion thereof and rotatably connected to the cam gear, the lift arm being pivoted on the pivotal pin in accordance with the rotation of the cam gear; a couple of sliding plates each of which is movably connected to respective ends of the lift arm so as to lift the combination of the chuck arm and the tray base; and shifting means for shifting the disc tray forwards or backwards, the shifting means being connected to the cam gear.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

The present invention will now be described in more detail with the accompanying drawings.

Figure 1:
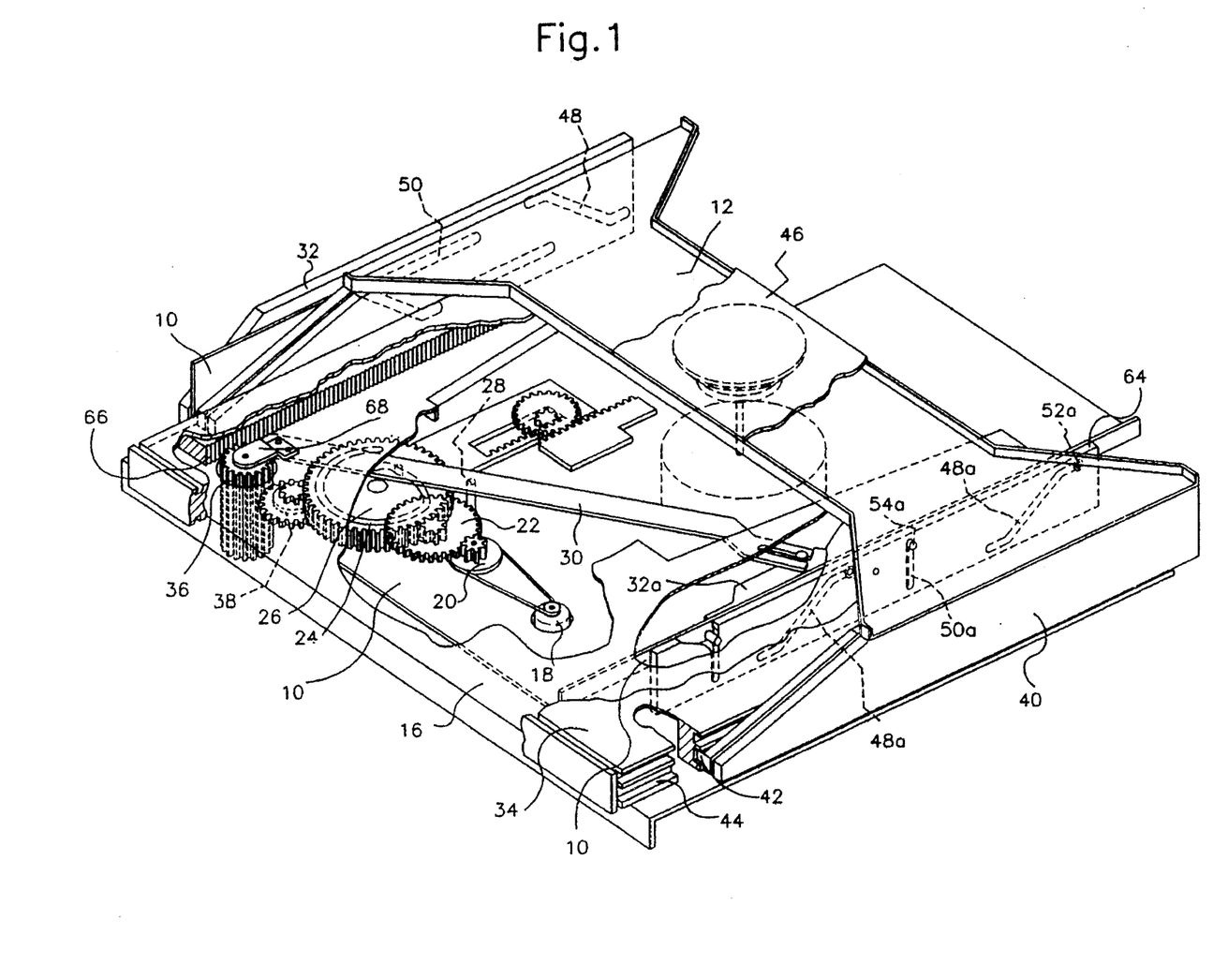
FIG. 1 is a perspective view of an embodiment according to the present invention.
Figure 2:
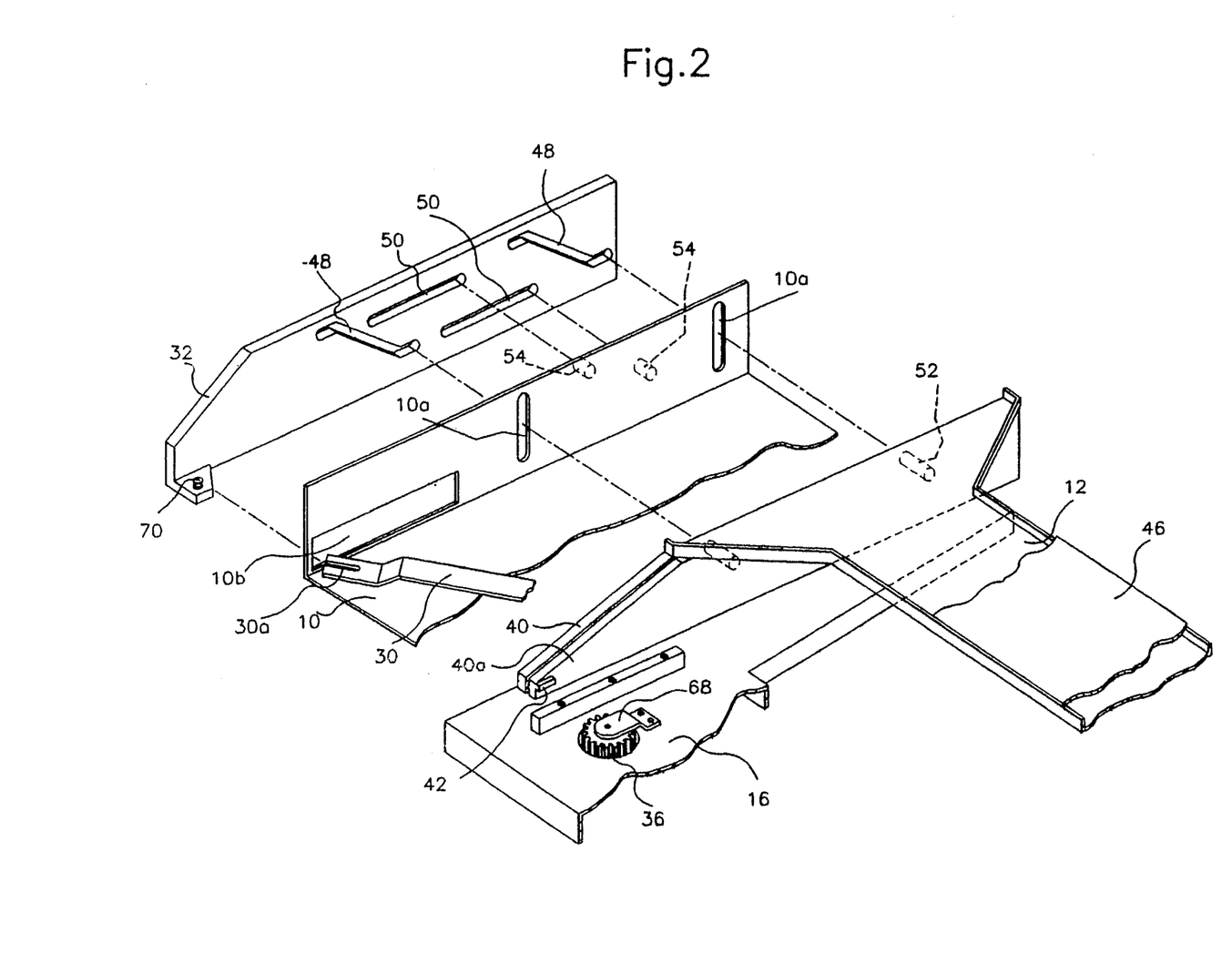
FIG. 2 is an exploded, partial view of main parts of the embodiment illustrated in FIG. 1.
Figure 3:
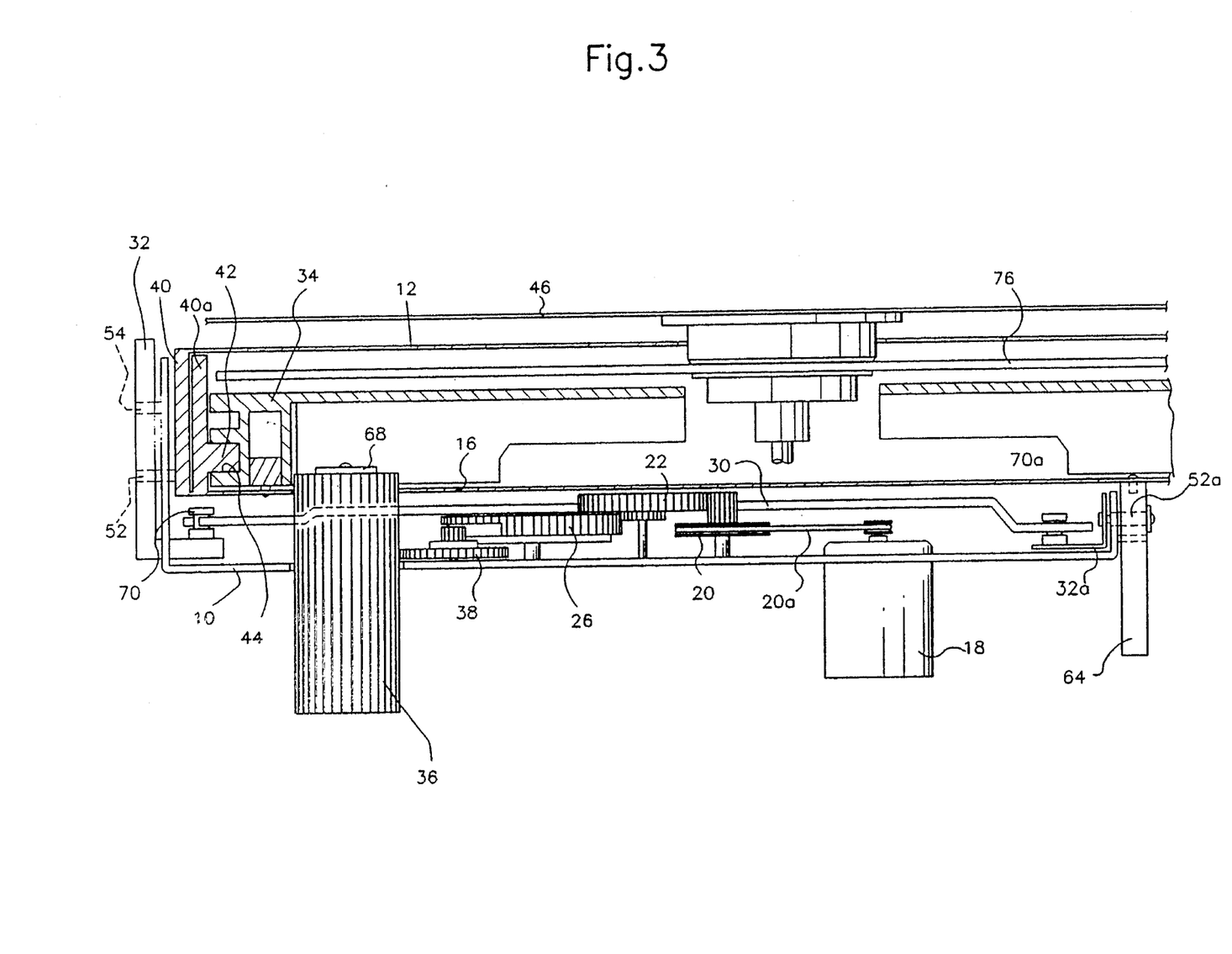
FIG. 3 is a vertical sectional view of FIG. 1.

As shown in FIGS. 1 to 3, a tray base 16 on which a disc tray 34 is mounted is integrally connected with a chuck arm 12 via an outer vertical plate 40 and which is located above a stationary chassis 10. In FIG. 1, the left-handed side portion represents the front direction and the right-handed side portion represents the rear direction.

Figure 5A:
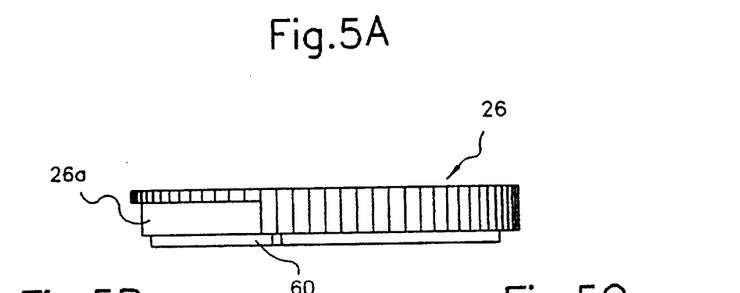
FIG. 5A is a front view of the cam gear.
Figure 5B:
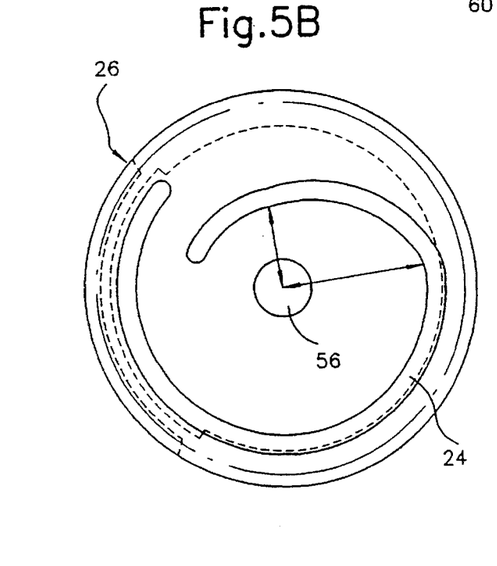
FIG. 5B is a plan view of the cam gear.
Figure 5C:
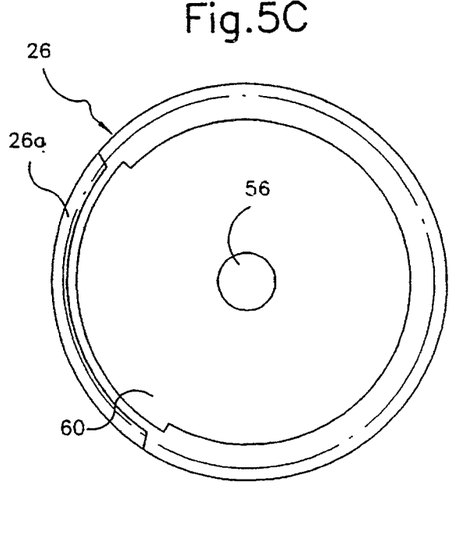
FIG. 5C is a bottom view of the cam gear.

A cam gear 26 is mounted on the front surface of the stationary chassis 10 to mesh with a drive means comprising a motor, a pulley and a reduction gear. The cam gear 26, as shown in FIGS. 5A to 5C, is provided with a spiral cam groove on the upper surface thereof and a rotation prevention projection 60 on the lower surface thereof so as to prevent a rotary power thereof from being transmitted to a shifting gear 36.

The detailed description regarding the construction of the cam gear having the cam groove 24 and the rotation prevention projection 60 will be made later.

Figure 6A:
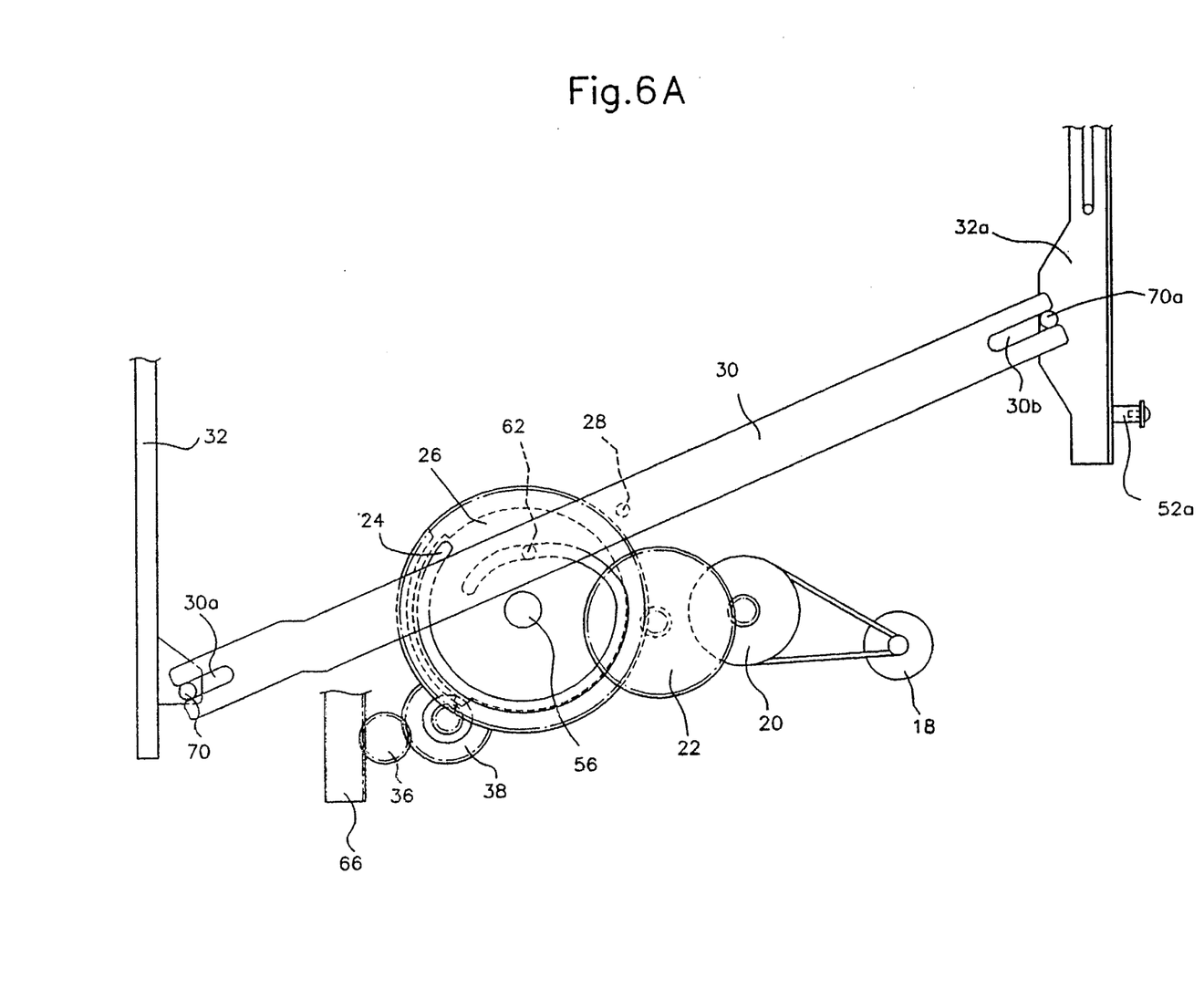
FIGS. 6A and 6B are plan views for illustrating an operative state of the lift arm according to the invention.

Referring to FIGS. 1 and 6A, a lift arm 30 is formed with a pivotal pin 28 at the lower central portion thereof so as to be rotatably mounted on the stationary chassis 10 through the pivotal pin 28. As illustrated in FIG. 3, the lift arm 30 is formed with downwards-inclined steps near the opposite ends thereof.

As shown in FIG. 6A, slots 30a, 30b are formed at both ends of the lift arm 30 to be rotatably fitted with respective pins 70, 70a provided on sliding plates 32, 32a. A pin 62 is fixed to the lower surface of the lift arm 30 between the pivotal pin 28 and the slot 30a, thereby to slide along the cam groove 24 of the cam gear 26.

Meanwhile, an inner vertical plate 40a is provided on a tray base 16 inside the outer vertical plate 40 which combines integrally the corresponding ends of the chuck arm 12 and the tray base 16.

In FIG. 2, guide pins 52, 52 are protruded from the outer surface of the outer vertical plate 40. Each of the guide pins 52, 52 are slidably fitted into corresponding inclined guide openings 48, 48 formed in the outer sliding plate 32 through corresponding vertical guide openings 10a, 10a formed in the stationary chassis 10. A guide rib 42 is formed on the inner lower portion of the inner vertical plate 40a so as to be slidably fitted with a side groove 44 formed in the disc tray 34 which is mounted on the tray base 16.

Further, a pre-determined gap is formed between the chuck arm 12 and the disc tray 34 so as to prevent the disc tray 34 from interfering with a chucking plate 46 mounted on the chuck arm 12, during the forward and backward displacement of the disc tray 34.

In FIGS. 1 to 3, the outer sliding plate 32 is provided at the front protruded portion thereof with a pin 70 rotatably engaged with the slot 30a of the lift arm 30, and on the vertical surface thereof with a couple of horizontal guide openings 50, 50 and a couple of inclined guide openings 48, 48.

The opposite ends of the inclined guide openings 48, 48 are formed horizontally. The stationary chassis 10 is formed in such manner that it has a flat plate at the central portion thereof and a vertical plate perpendicular to the flat plate at the ends thereof. As viewed in FIGS. 2 and 3, the left-side vertical plate of the stationary chassis 10 is positioned inside the outer sliding plate 32 and is provided with a couple of vertical guide openings 10a, 10a and a couple of guide pins 54, 54 which are projected from the outer surface thereof in order to slide in the horizontal guide openings 50, 50 of the outer sliding plate 32.

The left-side vertical plate of the stationary chassis 10 is formed with a rectangular opening 10b on the front portion thereof to allow the left end of the lift arm 30 to pass therethrough.

As shown in FIG. 3, the inner sliding plate 32a is located inside the right-side vertical plate of the stationary chassis 10 and is provided with guide pins 52a and 52a plus 54a and 54a protruding therefrom so as to be slidably fitted into corresponding inclined guide openings 48a, 48a and horizontal guide openings 50a, 50a all of which are formed on an elevating plate 64 (see FIG. 1).

As shown in FIG. 6A, the aforedescribed cam gear 26 is connected finally to a motor 18 at one side thereof via a reduction gear 22, a pulley 20 and a belt 20a, and to a power transmission gear 38 at the other side thereof, that is, the input side of the cam gear is meshed with the power transmission gear 38. Further, the output of the power transmission gear 38 is connected to a shifting gear 36 which is in mesh with a shifting rack 66 formed on the inner surface of the disc tray 34 (see FIGS. 1 and 8).

The shifting gear 36 is fixed to the tray base 16 at the upper surface thereof by a bracket 68, thereby to move upwards or downwards in the state of being meshed with the shifting rack 66 in accordance with the elevating operation of the tray base 16.

Figure 4:
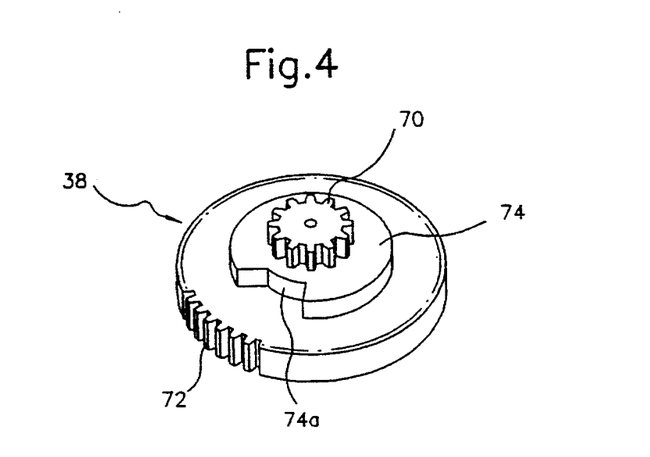
FIG. 4 is a perspective view of a power transmission gear located between a cam gear and shifting gear according to the invention.

FIG. 4 shows the power transmission gear 38 which is mounted between the cam gear 26 and the shifting gear 36, wherein the power transmission gear 38 comprises an upper gear 70 in mesh with the cam gear 26 on the upper surface thereof, a lower gear 72 in mesh with the shifting gear 36 on the lower surface thereof and a rotary disc 74 between the upper and lower gears. The rotary disc 74 is formed with a cut-out 74a to prevent the rotary force of the cam gear 26 from being transmitted to the shifting gear 36 when the lift arm 30 is in the operative state by the cam gear 26.

As shown in FIGS. 5A, 5B and 5C, the cam gear 26 is provided with a spiral cam groove 24 on the upper surface thereof and a rotation prevention projection 60 on the lower surface thereof.

The cam groove 24 is extended clockwise and radially, and the first quarterly portion of which is eccentric and the other portion of which is concentric with respect to a rotary shaft 56.

Hereinafter, the operations of the loading apparatus of the disc player according the invention will be described.

FIG. 6A shows an initial state wherein the cam gear 26 starts to rotate via the pulley 20 and the reduction gear 22 by the driving motor 18.

Figure 6B:
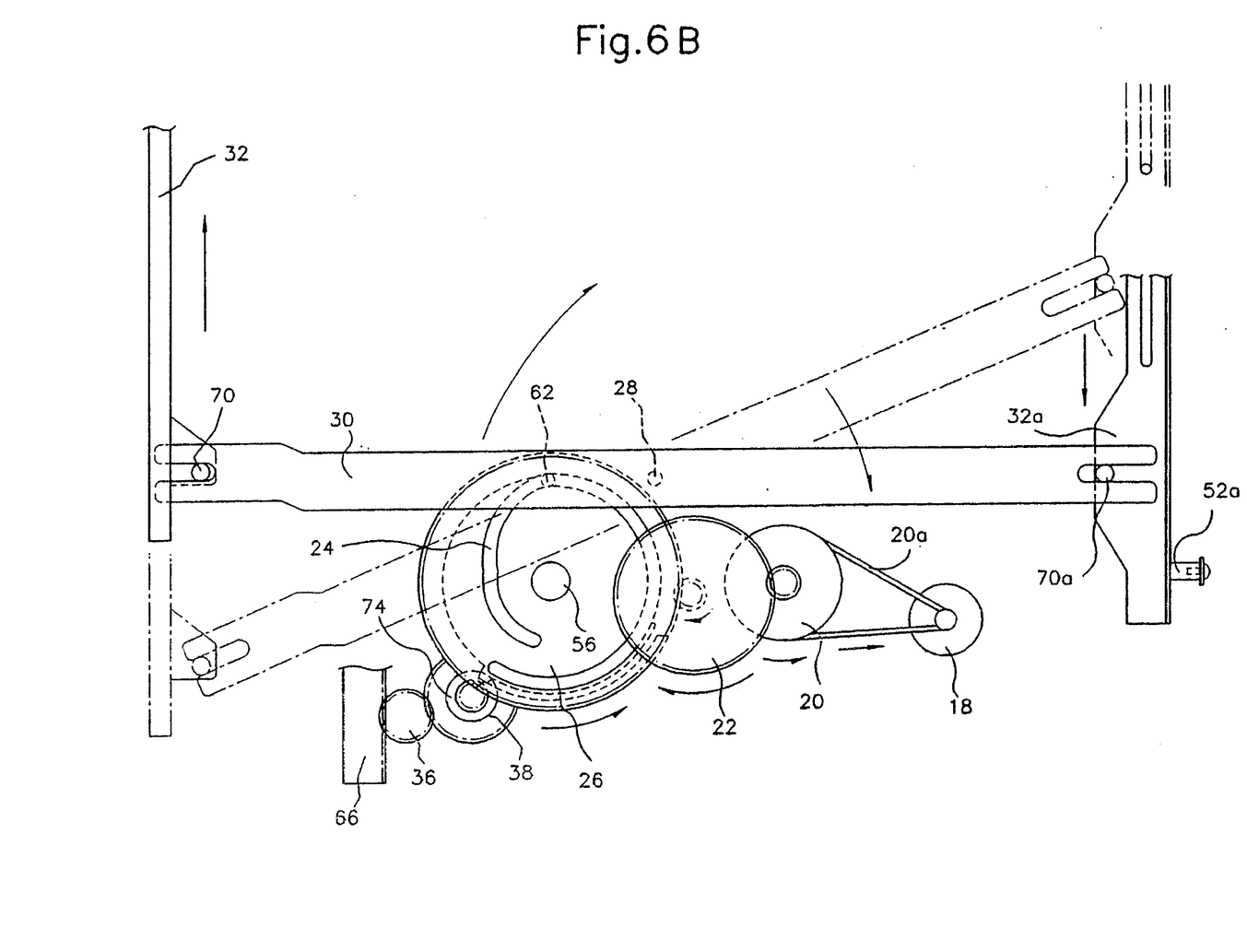
Figure 7:
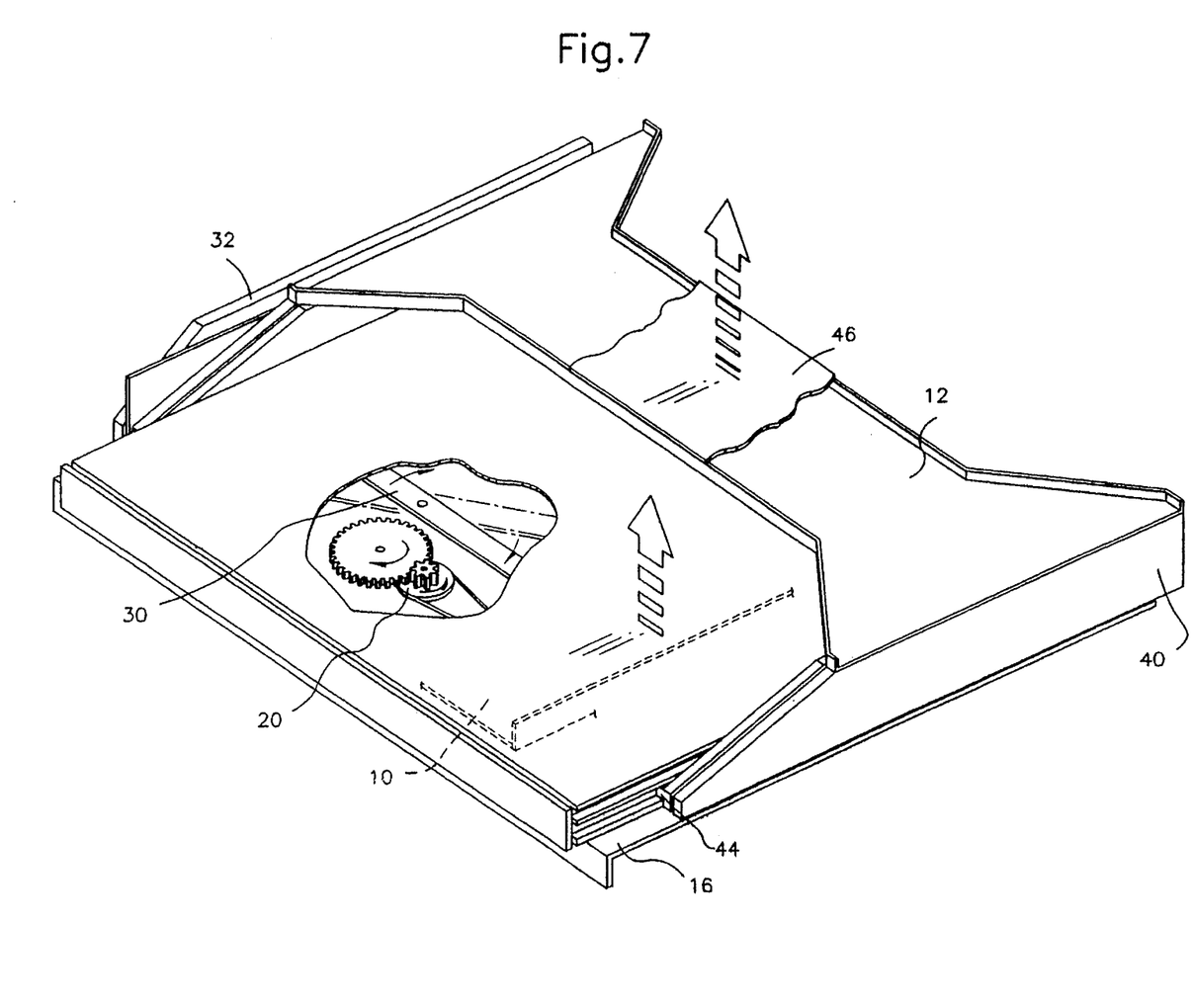
FIG. 7 is a perspective view for illustrating an operative state in which both a chuck arm and a tray base are lifted according to the loading apparatus.

FIG. 6B shows an operative state wherein the cam gear 26 is rotated counterclockwise, and then the pin 62 protruding from the lower surface of the lift arm 30 slides along the cam groove 24 of the cam gear 26, whereby the lift arm 30 is rotated clockwise with respect to the pivotal pin 28.

Due to such rotation of the lift arm 30, the sliding plates 32, 32a each of which is connected to the respective ends of the lift arm 30 are displaced by the length of the guide openings 50, 50, and accordingly the guide pins 52, 52 of the outer vertical plate 40 and the guide pins 52a, 52a of the inner sliding plate 32a are displaced in the guide openings 48, 48 of the outer sliding plate 32 and the guide openings 48a, 48a of the elevating plate 64, whereby the combination of the chuck arm 12 and tray base 16 is lifted. Due to the elevation of the chuck arm 12 and tray base 16, the chucking plate 46 is released from a chucking status, whereby the disc tray 34 is ready to move.

During the above-described elevation, power transmission from the cam gear 26 to the shifting gear 36 is not permitted by the operations of the rotation prevention projection 60 of the cam gear 26 and the cut-out 74a of the power transmission gear 38.

Figure 8:
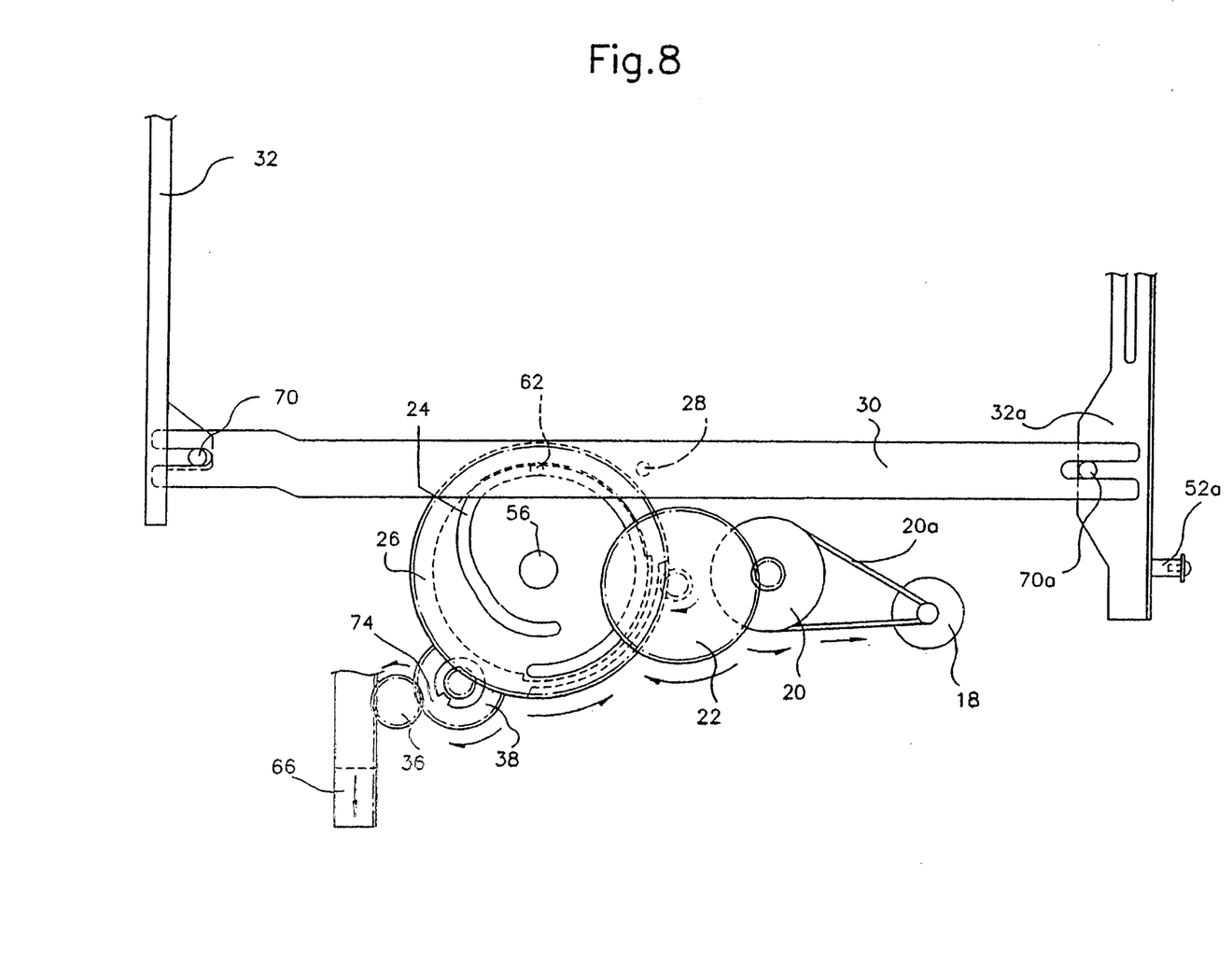
FIG. 8 is a lay-out of the cam gear according to the invention.
Figure 9:
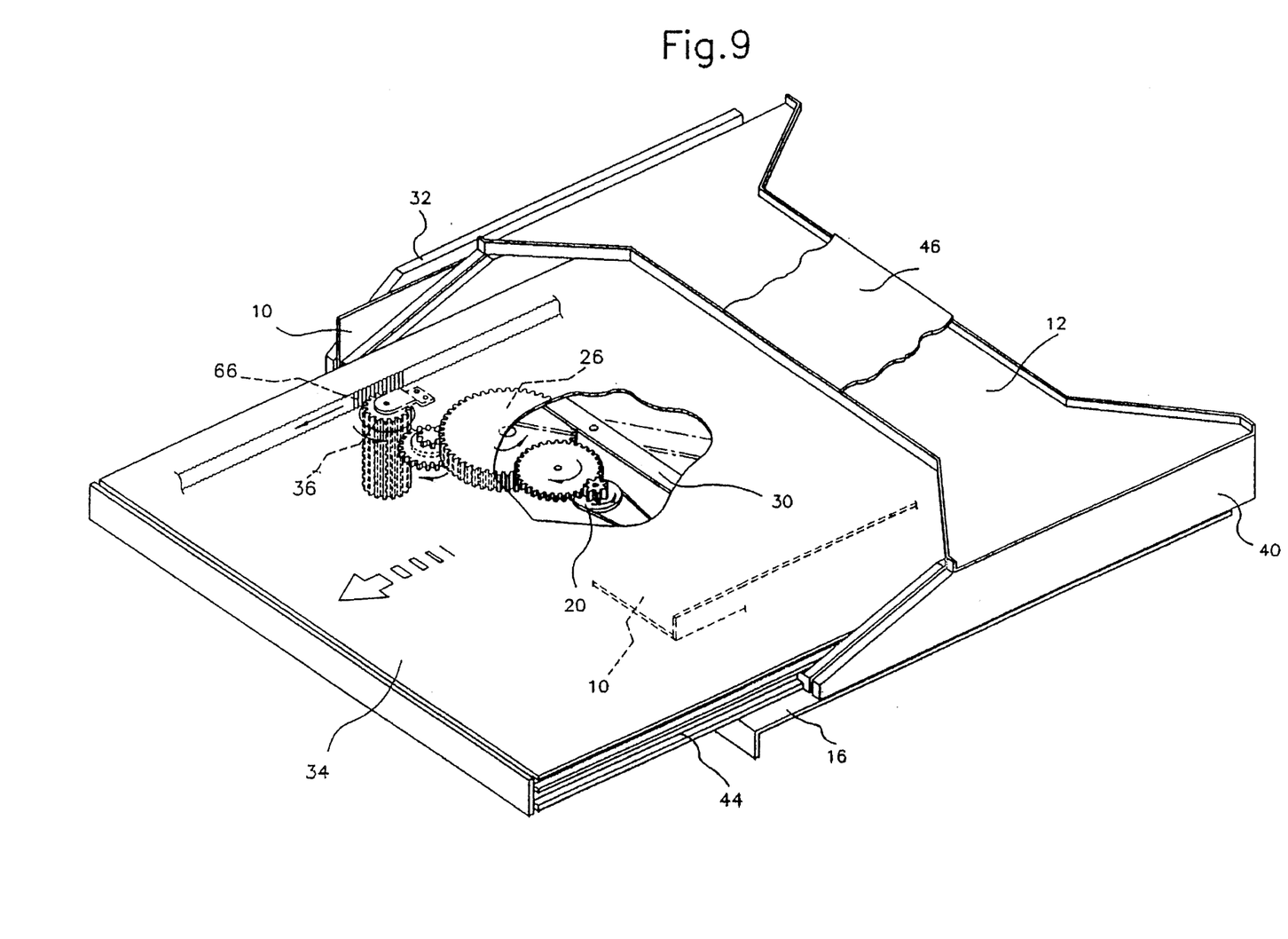
FIG. 9 is a perspective view for illustrating the operative state in which a disc tray is moved forwards by the rotation of the cam gear.

Under this state, as shown in FIG. 8, since the pin 62 of the lift arm 30 is positioned at the concentric portion of the cam groove 24, the lift arm 30 is not operative and the rotary force of the cam gear 26 is then transmitted to the power transmission gear 38 to rotate the shifting gear 36 meshed with the shifting rack 66, whereby the shifting rack 66 is displaced in the direction of the arrow and accordingly the disc tray 34 moves forwards, as shown in FIG. 9.

As apparent from the above description, simplification in structure and stable loading operation can be attained due to the combination of the chuck arm and the tray base and the operation of the lift arm, and reduction in weight of the entire arrangement can be attained by virtue of using the lift arm.

The invention is in no way limited to the embodiment described hereinabove. Various modifications of the disclosed embodiment as well as other embodiments of the invention will become apparent to persons skilled in the art upon reference to the description of the invention.

It is therefore contemplated that the appended claims will cover any such modifications or embodiments which fall within the true scope of the invention.

What is claimed is:

1. A loading apparatus of a multi-disc player comprising:

a stationary chassis having a vertical plate with a vertical guide opening and a first guide pin projected from an outer surface thereof;

a tray base for mounting a disc tray thereon, which is combined integrally with a chuck arm via an outer vertical plate having a second guide pin protruding from an outer surface thereof, said tray base being located above said stationary chassis;

a cam gear located on said stationary chassis via a rotary shaft and rotated by a drive means, said cam gear having a spiral cam groove on an upper surface thereof and a rotation prevention projection on a lower surface thereof, said spiral cam groove being extended clockwise and radially and having a first quarterly portion being eccentric and a second portion being concentric with respect to the rotary shaft;

a lift arm provided with a pivotal pin at a lower center portion thereof and rotatably connected to said cam gear, said lift arm being pivoted on said pivotal pin in accordance with the rotation of said cam gear;

an outer and an inner sliding plate, each of which is movably connected to respective ends of said lift arm so as to lift the combination of said chuck arm and said tray base, said inner sliding plate having a third guide pin, said outer sliding plate having a horizontal guide opening into which the first guide pin is slidably fitted and an inclined guide opening into which the second guide pin is slidably fitted; and a shifting means for shifting said disc tray forwards or backwards, said shifting means having a shifting gear connected to said cam gear so that the rotation prevention projection prevents a rotary power of said cam gear from being transmitted to said shifting gear, said shifting gear being rotationally fixed to said tray base and being meshed with a shifting rack formed on an inner side of said disc tray and said shifting means having a power transmission gear meshed with said cam gear and said shifting gear.

2. The loading apparatus according to claim 1, wherein said power transmission gear is provided with an upper gear on the upper surface thereof, a lower gear on the lower surface thereof and a rotary disc between said upper and lower gears, said upper gear and said lower gear being meshed with said cam gear and said shifting gear respectively, and said rotary disc being formed with a cut-out.

3. The loading apparatus according to claim 1, wherein said chuck arm is integrally combined with said tray base at the opposite ends thereof via said outer vertical plate having an inner vertical plate having a guide rib on an inner lower portion thereof so as to be slidably fitted with said disc tray.

4. The loading apparatus according to claim 1, wherein said shifting gear is secured to an upper surface of said tray base by a bracket.

5. The loading apparatus according to claim 1, wherein an input side of said cam gear is connected to a reduction gear and an output side of said cam gear is connected to said power transmission gear.

6. The loading apparatus according to claim 1, wherein said lift arm is slidably engaged with said cam groove of said cam gear by a pin fixed to the lower surface thereof.

* * * * *